US012638038B2

(12) United States Patent
Takazakura

(10) Patent No.: US 12,638,038 B2
(45) Date of Patent: May 26, 2026

(54) ROTARY CONNECTING STRUCTURE AND ROTARY COUPLER

(71) Applicant: YKK Corporation, Tokyo (JP)

(72) Inventor: Ryoichiro Takazakura, Toyama (JP)

(73) Assignee: YKK Corporation, Tokyo (JP)

( * ) Notice: Subject to any disclaimer, the term of this patent is extended or adjusted under 35 U.S.C. 154(b) by 275 days.

(21) Appl. No.: 18/574,266

(22) PCT Filed: Jun. 29, 2021

(86) PCT No.: PCT/JP2021/024539
§ 371 (c)(1),
(2) Date: Dec. 26, 2023

(87) PCT Pub. No.: WO2023/275988
PCT Pub. Date: Jan. 5, 2023

(65) Prior Publication Data
US 2024/0295238 A1     Sep. 5, 2024

(51) Int. Cl.
*F16B 45/02* (2006.01)
*A44B 13/02* (2006.01)
(Continued)

(52) U.S. Cl.
CPC .............. *F16B 45/02* (2013.01); *A44B 13/02* (2013.01); *B29C 45/0017* (2013.01);
(Continued)

(58) Field of Classification Search
CPC .......... F16C 11/04; A44B 11/00; A45C 13/30; F16B 45/02; F16B 45/036
See application file for complete search history.

(56) References Cited

U.S. PATENT DOCUMENTS

| | | | | |
|---|---|---|---|---|
| 3,995,822 A | * | 12/1976 | Einhorn | ................ F16B 45/008 |
| | | | | 248/339 |
| 4,464,813 A | * | 8/1984 | Bakker | ................. F16B 45/036 |
| | | | | 24/601.2 |

(Continued)

FOREIGN PATENT DOCUMENTS

| | | |
|---|---|---|
| JP | S59-13108 A | 1/1984 |
| JP | H01-98916 U | 7/1989 |

(Continued)

OTHER PUBLICATIONS

Machine Translation of JP06-200917A, generated Nov. 24, 2025 (Year: 1994).*

(Continued)

*Primary Examiner* — Daniel J Wiley
(74) *Attorney, Agent, or Firm* — Kilpatrick Townsend & Stockton LLP

(57)     ABSTRACT

A halter snap includes a hook member serving as a primary molded product and a holder member serving as a secondary molded product, the hook member and the holder member being injection-molded from resin and rotatably coupled to each other. The primary molded product includes a shaft formed irreducible in diameter. The secondary molded product includes a bearing portion coupled to the shaft and formed unincreasable in diameter. The shaft is configured to rotate after being moved in an X-axis direction from a state where the shaft is contact-coupled to the bearing portion. The hook member and the holder member include POM.

13 Claims, 10 Drawing Sheets

(51) Int. Cl.

| | |
|---|---|
| *B29C 45/00* | (2006.01) |
| *B29K 55/02* | (2006.01) |
| *B29K 59/00* | (2006.01) |
| *B29K 77/00* | (2006.01) |
| *B29L 31/00* | (2006.01) |
| *B29L 31/04* | (2006.01) |

(52) U.S. Cl.

CPC ...... *B29K 2055/02* (2013.01); *B29K 2059/00* (2013.01); *B29K 2077/00* (2013.01); *B29L 2031/04* (2013.01); *B29L 2031/75* (2013.01)

(56) References Cited

U.S. PATENT DOCUMENTS

| | | | | |
|---|---|---|---|---|
| 4,577,374 | A * | 3/1986 | Lii | F16G 15/08 |
| | | | | 24/615 |
| 4,617,704 | A * | 10/1986 | Kasai | F16B 45/036 |
| | | | | 24/601.2 |
| 4,665,592 | A * | 5/1987 | Kasai | B29C 45/26 |
| | | | | 24/601.2 |
| 4,868,954 | A * | 9/1989 | Kasai | F16B 45/036 |
| | | | | 24/601.2 |
| 4,908,913 | A * | 3/1990 | Mori | F16B 45/036 |
| | | | | 24/907 |
| 5,127,137 | A * | 7/1992 | Krauss | F16B 45/036 |
| | | | | 24/265 R |
| 5,146,657 | A * | 9/1992 | Frano | F16B 45/008 |
| | | | | D8/382 |
| 5,148,582 | A * | 9/1992 | Dennis, Jr. | A44B 11/266 |
| | | | | 24/615 |
| 5,274,887 | A * | 1/1994 | Fudaki | F16G 15/08 |
| | | | | 24/600.9 |
| 5,438,736 | A * | 8/1995 | Terada | F16B 45/023 |
| | | | | 24/265 H |
| 5,450,661 | A * | 9/1995 | Rekuc | F16B 45/036 |
| | | | | 24/599.6 |
| 5,471,716 | A * | 12/1995 | Takahashi | A44B 11/263 |
| | | | | 24/615 |
| 5,475,901 | A * | 12/1995 | Anscher | F16B 21/073 |
| | | | | 24/600.9 |
| 5,502,878 | A * | 4/1996 | Anscher | F16G 15/08 |
| | | | | 24/265 H |
| 5,548,875 | A * | 8/1996 | Hart | F16B 45/024 |
| | | | | 24/265 H |
| 5,566,428 | A * | 10/1996 | Takahashi | F16G 15/08 |
| | | | | 24/265 R |
| 5,634,246 | A * | 6/1997 | Jermyn, Jr. | F16G 15/08 |
| | | | | 24/601.5 |
| 5,671,514 | A * | 9/1997 | Matoba | F16B 45/036 |
| | | | | 24/601.2 |
| D402,189 | S * | 12/1998 | Izumi | D8/382 |
| 6,317,940 | B1 * | 11/2001 | Matoba | F16B 45/02 |
| | | | | 24/601.2 |
| 6,574,839 | B2 * | 6/2003 | Matoba | F16B 45/036 |
| | | | | 24/601.2 |
| 6,671,933 | B1 * | 1/2004 | Friend | F16G 15/08 |
| | | | | 24/115 F |
| 6,739,022 | B1 * | 5/2004 | Chen | F16G 15/08 |
| | | | | 24/265 H |
| D583,654 | S * | 12/2008 | Uehara | D8/367 |
| 7,946,002 | B2 * | 5/2011 | Uehara | A44B 11/266 |
| | | | | 24/601.2 |
| 7,992,263 | B2 * | 8/2011 | Uehara | F16G 15/08 |
| | | | | 24/601.2 |
| D649,024 | S * | 11/2011 | Takazakura | D8/367 |
| 8,448,307 | B2 * | 5/2013 | Mitchell | H01F 7/0263 |
| | | | | 24/601.5 |
| D736,070 | S * | 8/2015 | Kaneko | D8/367 |
| 10,060,466 | B2 * | 8/2018 | Kaneko | F16B 45/036 |
| 10,233,964 | B2 * | 3/2019 | Schmitz | F16B 45/036 |
| 10,731,697 | B2 * | 8/2020 | Chan | F16G 15/08 |
| 2001/0037543 | A1 * | 11/2001 | Matoba | F16B 45/008 |
| | | | | 24/600.9 |
| 2007/0261210 | A1 * | 11/2007 | Chen | F16B 45/049 |
| | | | | 24/265 H |
| 2008/0040900 | A1 * | 2/2008 | Uehara | F16B 21/16 |
| | | | | 24/375 |
| 2014/0325797 | A1 * | 11/2014 | Hasegawa | A44B 17/0052 |
| | | | | 24/108 |
| 2016/0084292 | A1 * | 3/2016 | Kaneko | F16B 45/036 |
| | | | | 24/592.1 |
| 2024/0077103 | A1 * | 3/2024 | Sakai | A45C 13/00 |
| 2025/0204649 | A1 * | 6/2025 | Tseng | A44B 19/262 |

FOREIGN PATENT DOCUMENTS

| | | |
|---|---|---|
| JP | H06-200917 A | 7/1994 |
| JP | H07-208440 A | 8/1995 |
| WO | 2017/064778 A1 | 4/2017 |

OTHER PUBLICATIONS

International Preliminary Report on Patentability, PCT Patent Application No. PCT/JP2021/024539, Dec. 14, 2023, 6 pages.
International Search Report, PCT Patent Application No. PCT/JP2021/024539, Sep. 14, 2021, 5 pages.
Written Opinion, PCT Patent Application No. PCT/JP2021/024539, Sep. 14, 2021, 5 pages.

* cited by examiner

ROTARY CONNECTING STRUCTURE AND ROTARY COUPLER

TECHNICAL FIELD

The present invention relates to a rotary coupling structure, a rotary coupler, and a method of configuring the rotary coupling structure.

BACKGROUND ART

As for a typical rotary coupler, Patent Literature 1 describes a universal swivel hook assembly including a hook engaged with a bar (a holder-side member) by hand assembling. Moreover, Patent Literature 2 describes a synthetic resin belt coupler including a belt attachment member having a neck and an engagement member having a through hole, the synthetic resin belt coupler made by one injection process in a state where the neck is fitted in the through hole.

CITATION LIST

Patent Literature(s)

Patent Literature 1: U.S. Pat. No. 5,127,137
Patent Literature 2: JP 7-208440 A

SUMMARY OF THE INVENTION

Problem(s) to be Solved by the Invention

In the meanwhile, since the hook of the universal swivel hook assembly described in Patent Literature 1 is engaged with the bar (the holder-side member) by hand assembling, the engagement requires time and effort.

In contrast, as for the synthetic resin belt coupler described in Patent Literature 2, the synthetic resin belt coupler is made by one injection process, which eliminates the necessity for time and effort as described above: however, in order to cause the neck of the belt attachment member to be in a state of being fitted in the through hole of the engagement member, a gap between the neck and the through hole is increased and, further, a mold structure for forming the fitted state is likely to be complicated An object of the invention is to provide a rotary coupling structure, a rotary coupler, and a method of configuring the rotary coupling structure that eliminate the necessity for hand-assembling two members and allow a clearance (a gap) between the two members to be reduced.

Means for Solving the Problem(s)

A rotary coupling structure according to an aspect of the invention includes a primary molded product and a secondary molded product, the primary molded product and the secondary molded product being injection-molded from resin, the primary molded product and the secondary molded product being rotatably coupled to each other, in which the primary molded product includes a shaft, the secondary molded product includes a bearing portion coupled to the shaft, and the shaft is configured to rotate after being moved from a state where the shaft is contact-coupled to the bearing portion.

A rotary coupler according to another aspect of the invention includes a hook member and a holder member, the hook member and the holder member being injection-molded from resin, in which the hook member includes a shaft formed irreducible in diameter, the holder member includes a bearing portion formed unincreasable in diameter, the shaft is configured to rotate after being moved from a state where the shaft is contact-coupled to the bearing portion, and in a state where the shaft is rotatable with respect to the bearing portion, a gap in an axial direction of the rotary coupler between the hook member and the holder member is smaller than 0.5 mm.

A method of configuring a rotary coupling structure according to still another aspect of the invention includes: injection-molding a primary molded product including a shaft from resin: after hardening of a surface of the primary molded product, injection-molding a secondary molded product from resin in such manner that a bearing portion is formed in a state of being contact-coupled to the shaft; and after hardening of the primary molded product and the secondary molded product, moving the shaft with respect to the bearing portion one time only to put the shaft into a rotatable state.

According to the aspects of the invention, it is possible to provide a rotary coupling structure, a rotary coupler, and a method of configuring the rotary coupling structure that eliminate the necessity for hand-assembling two members and allow a clearance (a gap) between the two members to be reduced.

BRIEF DESCRIPTION OF THE DRAWINGS

FIG. 4 is a cross-sectional view of the halter snap taken along a IV-IV line in FIG. 1.

FIG. 5 is a cross-sectional view of the halter snap corresponding to FIG. 4, illustrating a manufactured state.

DESCRIPTION OF EMBODIMENT(S)

Configuration of the Exemplary Embodiment

Description will be made below on an exemplary embodiment of the invention with reference to the drawings.

Figure 1:
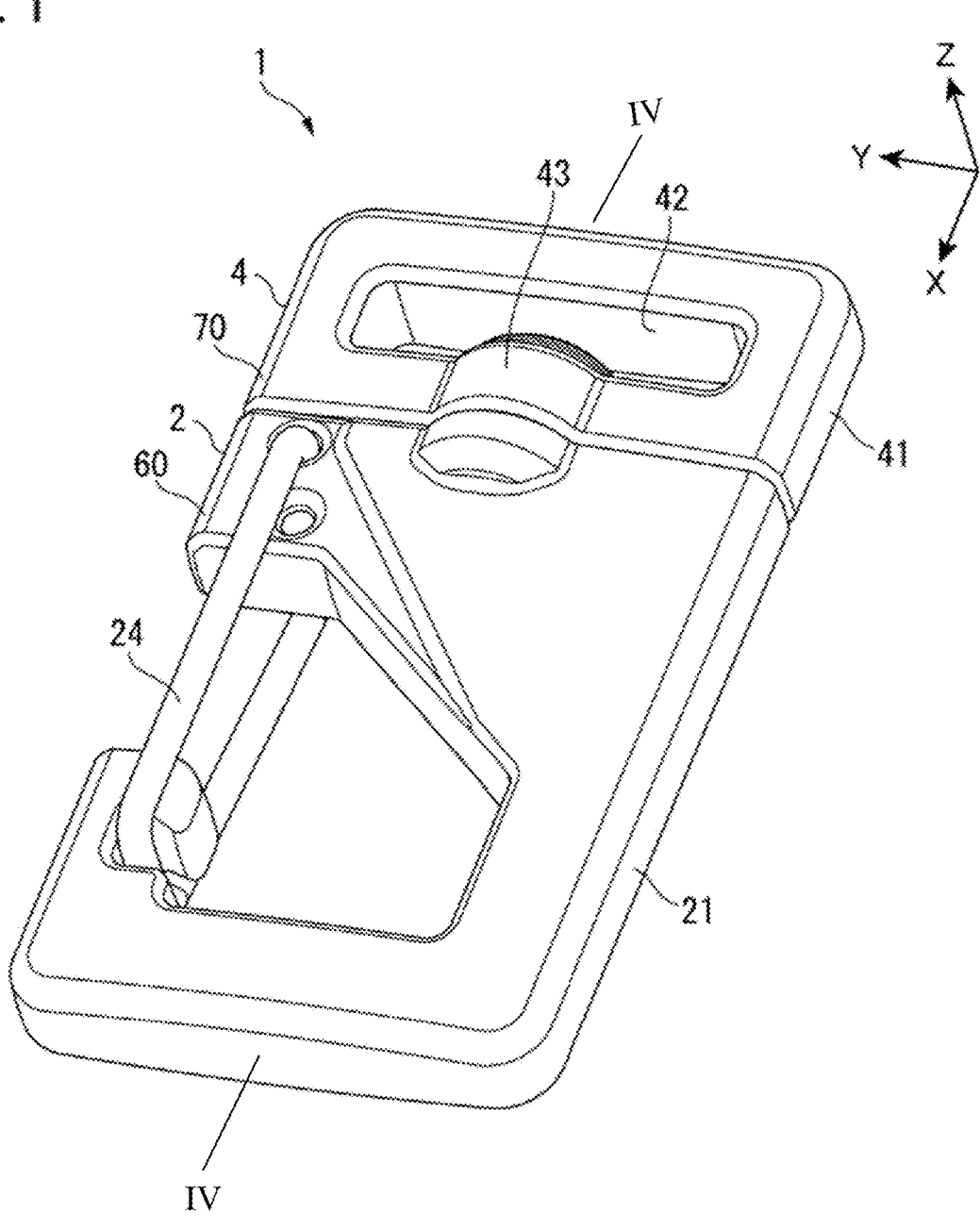
FIG. 1 is a perspective view illustrating a halter snap according to an exemplary embodiment of the invention.
Figure 2:
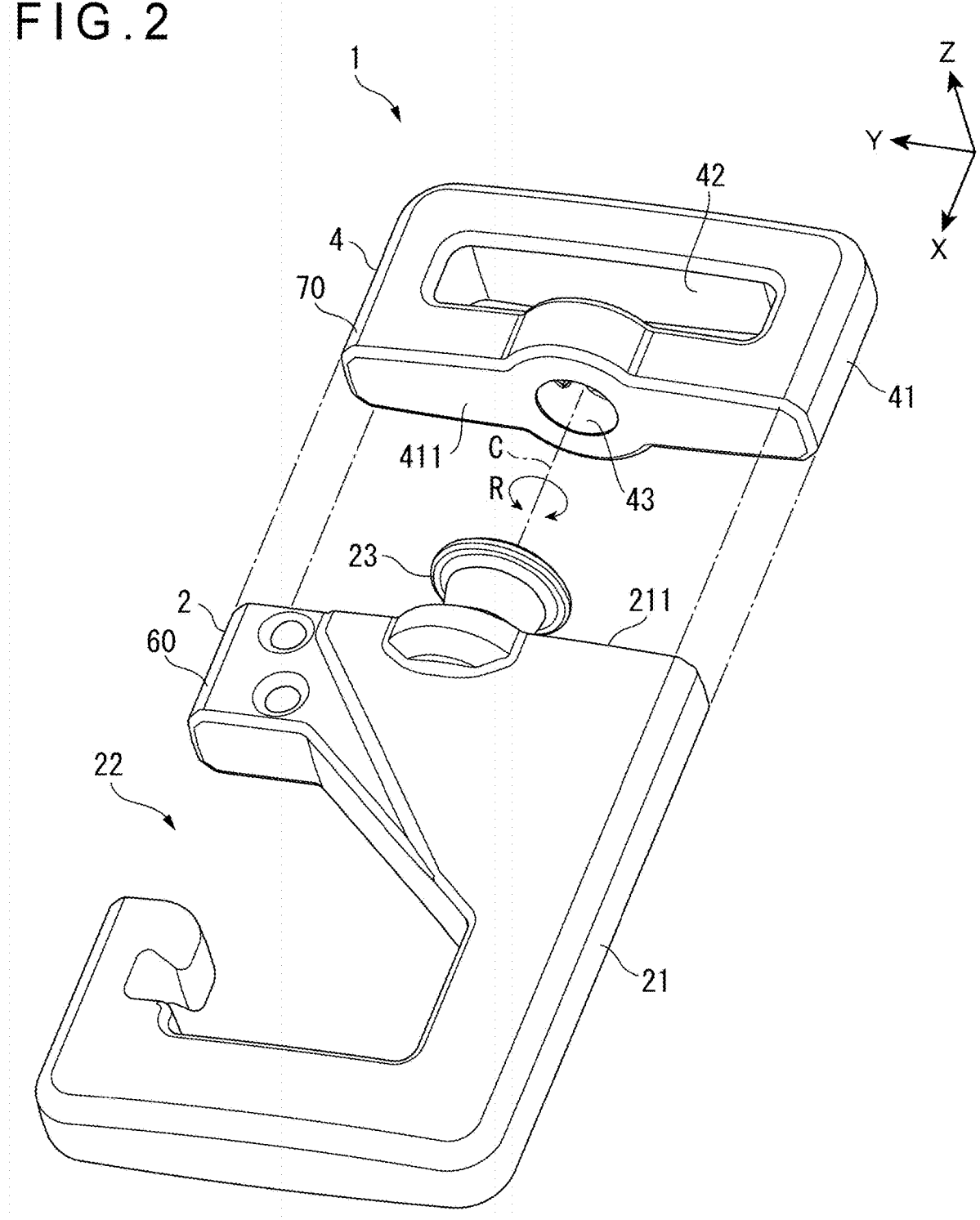
FIG. 2 is an exploded perspective view illustrating the halter snap.

Referring to FIG. 1 and FIG. 2, a halter snap 1, which is a rotary coupler according to the exemplary embodiment, includes a resin hook member 2 serving as a first member attachable to a first object to couple (not illustrated) such as a bag and a resin holder member 4 serving as a second member attachable to a second object to couple (not illustrated) such as a belt. The hook member 2 and the holder member 4 are relatively rotatable in respective R directions around an axial center C.

Hereinbelow, an X-axis direction is defined as an up-and-down direction of the halter snap 1, a Y-axis direction perpendicular to the X-axis direction is defined as a right-and-left direction of the halter snap 1, and a Z-axis direction perpendicular to the X- and Y-axis directions is defined as a thickness direction of the halter snap 1. An axial direction of the axial center C is along the X-axis direction.

The hook member 2 includes a hook body 21 on which the first object to couple is to be hung, a shaft 23 (a neck) formed to project upward from a facing surface 211 of the hook body 21 facing the holder member 4, and an opening/closing member 24 attached to the hook body 21 to cause a hook opening 22 of the hook body 21 to be openable/closable. In the exemplary embodiment, the hook body 21 and the shaft 23 are integrally injection-molded from POM (polyacetal). A portion of the hook body 21 continuous with the shaft 23 is thickened in the Z-axis direction to improve a strength of coupling to the holder member 4. The opening/closing member 24 includes a metal fitting.

Figure 3:
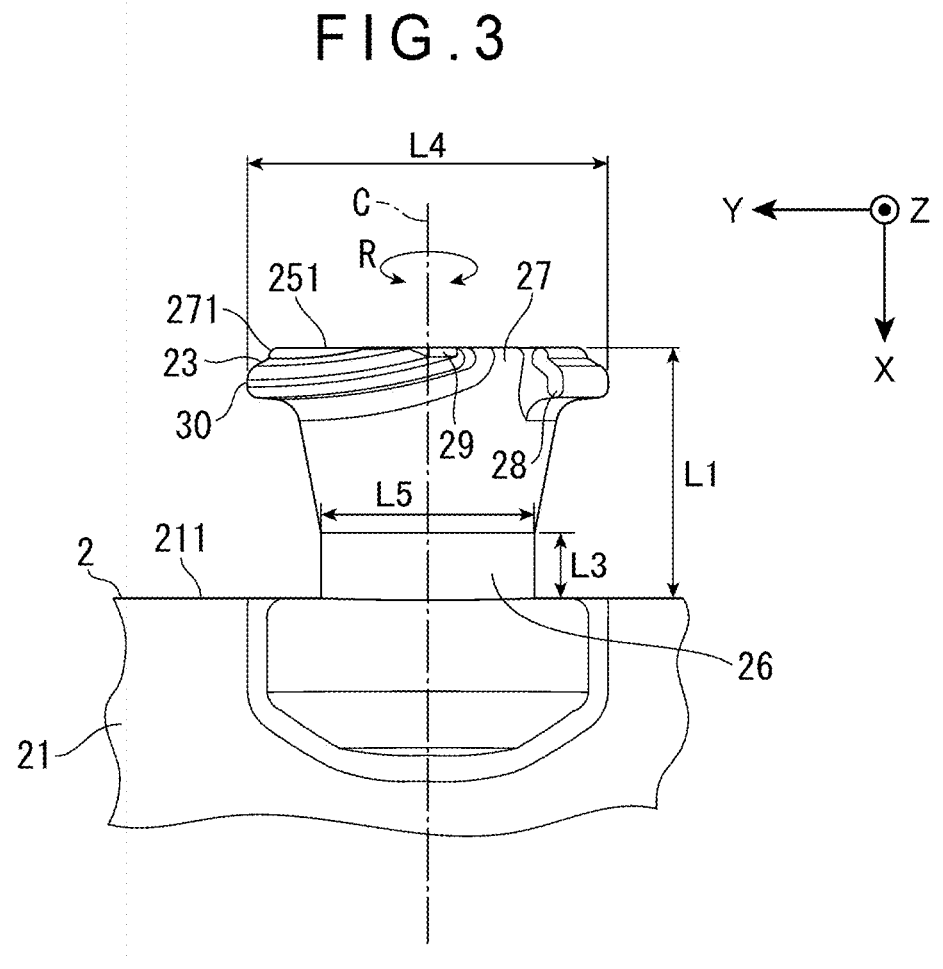
FIG. 3 is a diagram of assistance in explaining a shaft of the halter snap.

The shaft 23 includes a base portion 26 near the hook body 21 and a distal portion 27 (a head) located at an upper position with respect to the base portion 26 as illustrated in FIG. 3. The shaft 23 is formed solid to be irreducible in diameter.

A dimension L1 of the shaft 23 in the axial direction (in the exemplary embodiment, a dimension in the X-axis direction) is longer than a dimension L2 of a later-described bearing portion 43 in the axial direction (in the exemplary embodiment, a dimension in the X-axis direction) by an amount corresponding to a dimension L3 of the base portion 26 in the axial direction (in the exemplary embodiment, a dimension in the X-axis direction) (see FIG. 3 and FIG. 4). This allows the shaft 23 to move in the X-axis direction with respect to the bearing portion 43 by the amount corresponding to the dimension L3 of the base portion 26 in the axial direction.

The shaft 23 has a shape-conformable portion to the bearing portion 43 (a portion other than the base portion 26). The shaft 23 has a dimension in a width direction (a radial direction) perpendicular to the axial direction, the diameter being gradually increased from the base portion 26 toward the distal portion 27. A dimension L4 of the distal portion 27 of the shaft 23 in the radial direction is larger than a dimension L5 of the base portion 26 of the shaft 23 in the radial direction (see FIG. 3). In the exemplary embodiment, the shaft 23 is formed substantially in a shape of a truncated cone and thus the diameter is increased from the base portion 26 toward the distal portion 27.

The distal portion 27 of the shaft 23 has a circumferential exterior surface 271 continuous in the R direction (a circumferential direction) around the axial center C. A first guide circumferential portion 30 having an end 28 and a second end 29 is formed on the circumferential exterior surface 271. The first guide circumferential portion 30 extends in an inclined manner such that the first end 28 and the second end 29 are at different positions in the R direction. The first guide circumferential portion 30 has a length slightly shorter than a length sufficient to circumferentially surround the distal portion 27 in the exemplary embodiment and is formed in a shape of a male thread projecting in the radial direction of the shaft 23. The second end 29 is located at an upper position with respect to the first end 28 and is flush with a top surface 251 of the shaft 23. The distal portion 27 is engaged with the holder member 4 in the axial direction to couple the hook member 2 and the holder member 4 together so that the hook member 2 and the holder member 4 are not separated.

The base portion 26 is formed in a shape of a column along the X-axis direction. In order to put the halter snap 1 into an in-use state illustrated in FIG. 4 from a manufactured state (a state before the halter snap 1 is put into the in-use state) illustrated in FIG. 5, the shaft 23 is movable in the X-axis direction with respect to the bearing portion 43 by the amount corresponding to the above-described dimension L3 in the axial direction.

The holder member 4, which is integrally injection-molded from POM, includes a holder body 41, an attachment hole 42 through which the second object to couple is to be inserted, and the bearing portion 43 coupled to the above-described shaft 23 and formed unincreasable in diameter.

The holder body 41 has a facing surface 411 facing the facing surface 211 of the hook body 21 in the X-axis direction. In the in-use state of the halter snap 1, the facing surface 411 is in contact with the facing surface 211 in the X-axis direction as illustrated in FIG. 4. In the manufactured state of the halter snap 1 (the state before the halter snap 1 is put into the in-use state), the facing surface 411 is spaced from the facing surface 211 as illustrated in FIG. 5. A portion of the holder member 4 where the bearing portion 43 is formed is thickened in the Z-axis direction to improve the strength of the coupling to the hook member 2.

The attachment hole 42 is formed in the holder body 41. The attachment hole 42 is defined by a first hole formation surface 421 and a second hole formation surface 422 along the Y-axis direction and right and left continuous surfaces 423 (in the exemplary embodiment, surfaces along the X-axis direction) continuous with the first hole formation surface 421 and the second hole formation surface 422. The first hole formation surface 421 is closer to the hook member 2 than the second hole formation surface 422 is.

Figure 4:
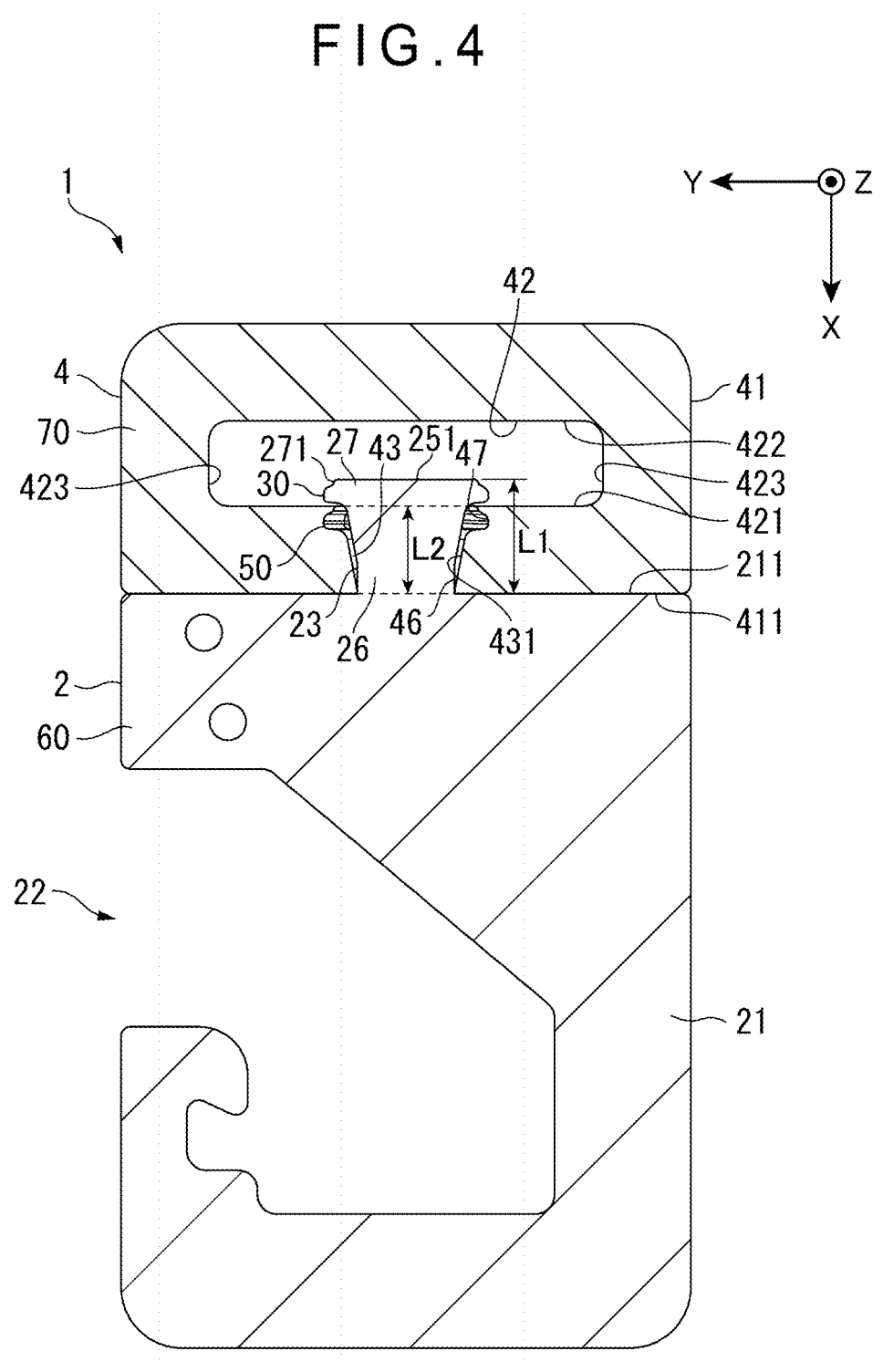
Figure 5:
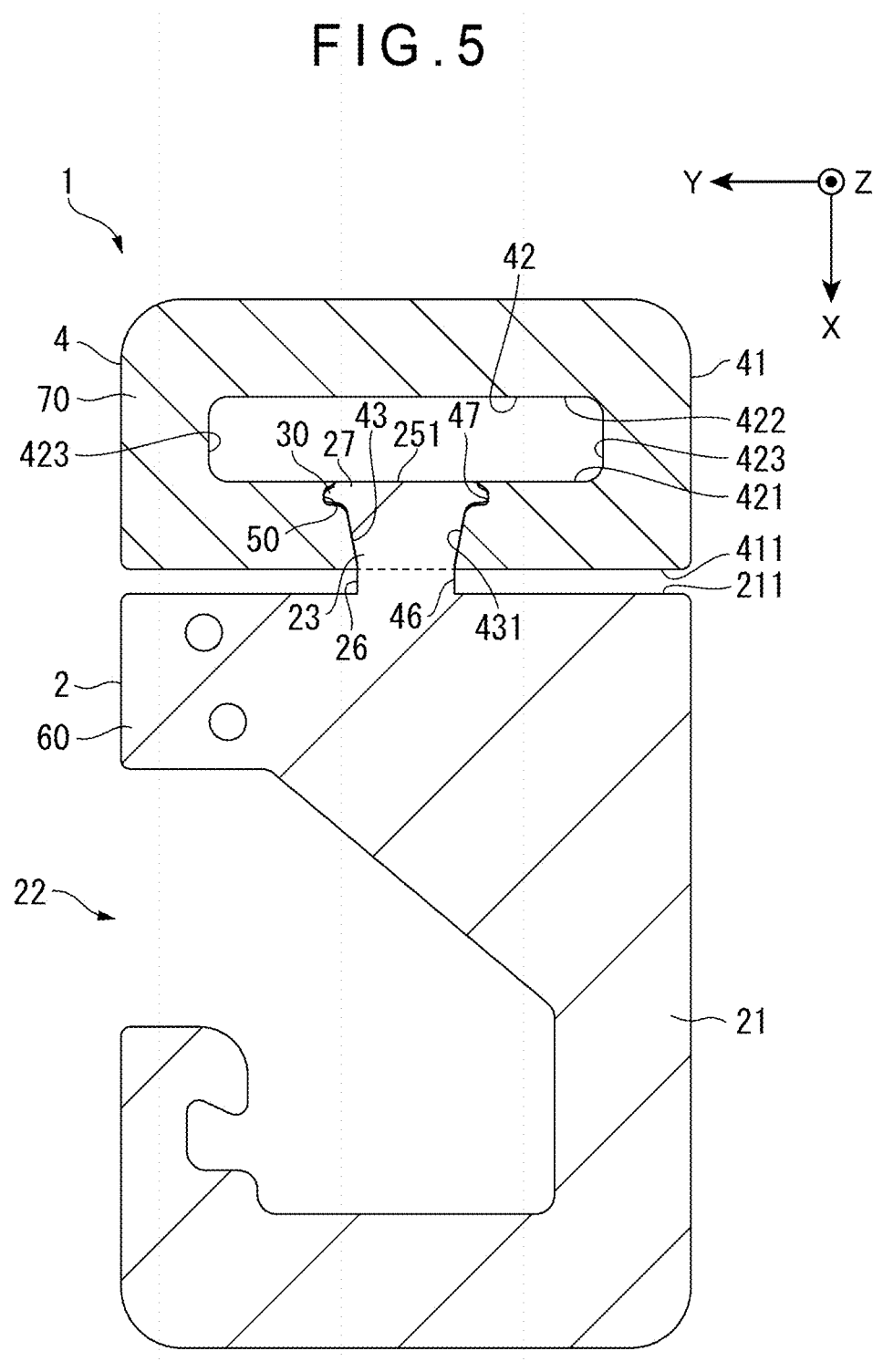

The bearing portion 43 is in a complementary shape (the shape-conformable portion) to the shaft 23 except the base portion 26 and has a circumferential interior surface 431 continuous in the R direction as illustrated in FIGS. 4 and 5. The bearing portion 43 is open in the above-described facing surface 411 and first hole formation surface 421 and the opening in the first hole formation surface 421 is formed to be larger than the opening in the facing surface 411. In the exemplary embodiment, the bearing portion 43 is formed substantially in a shape of a truncated cone and thus has a diameter increased from a first end portion 46 near the hook member 2 toward a second end portion 47 further spaced from the hook member 2 than the first end portion 46 is.

A second guide circumferential portion 50 is formed in the second end portion 47 of the bearing portion 43. The second guide circumferential portion 50 is formed in a shape of a complementary female thread fittable to the first guide circumferential portion 30. The second guide circumferential portion 50 having a first end and a second end extends in the R direction around the axial center in an inclined manner such that the first end and the second end are at different positions in the axial direction. The second guide circumferential portion 50 has a length slightly shorter than a length sufficient to circumferentially surround the distal portion 47 in the exemplary embodiment and is recessed in the radial direction of the shaft 43. The second end of the second guide circumferential portion 50 is located at an upper position with respect to the first end thereof and is flush with the first hole formation surface 421 (not illustrated).

The hook member 2 and the holder member 4 described above configure a rotary coupling structure allowing for mutual rotation in the respective R directions. Additionally, in the exemplary embodiment, a tensile strength determined by a tensile test in which the hook member 2 and the holder member 4 are pulled in directions to separate in the X-axis direction is 200 N or more.

Procedure of Manufacturing Halter Snap

Figure 6:
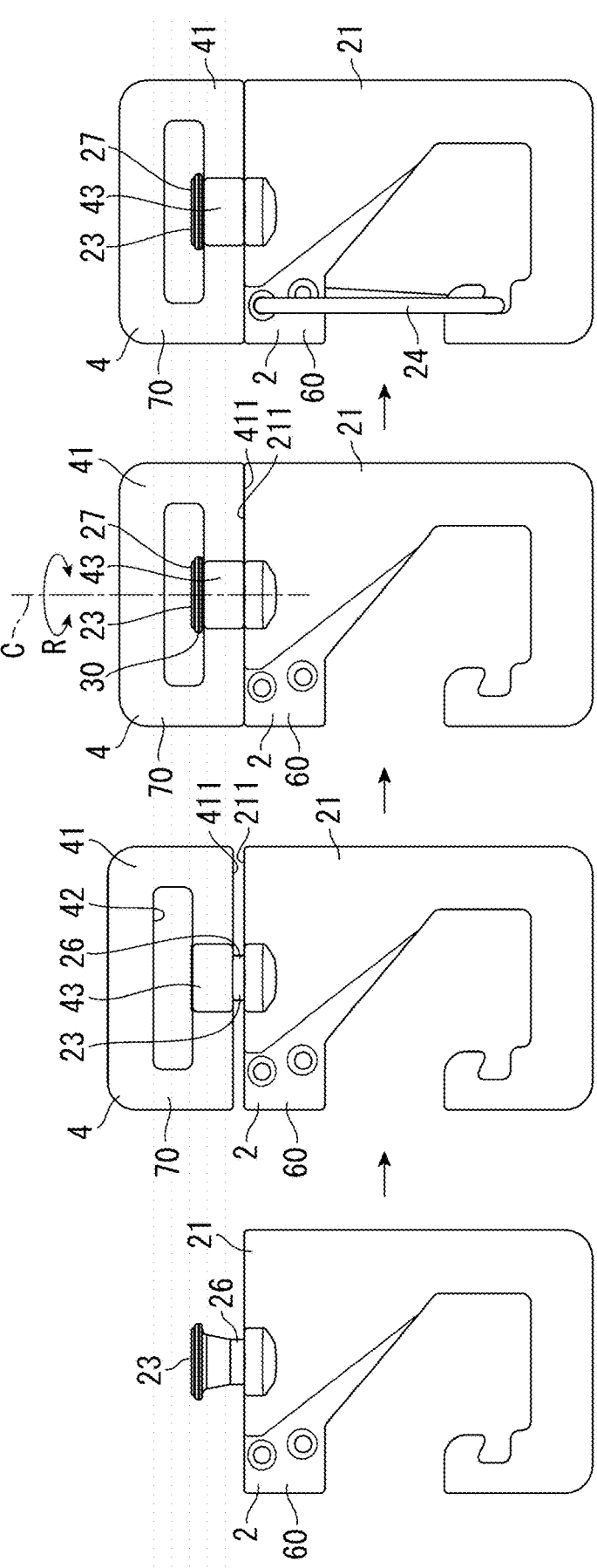
FIG. 6 is a diagram of assistance in explaining a procedure of manufacturing the halter snap.

Description will be made below on a procedure of manufacturing the above-described halter snap 1. The manufacturing of the halter snap 1 proceeds substantially in an order indicated by arrows from left to right in FIG. 6.

Figure 7:
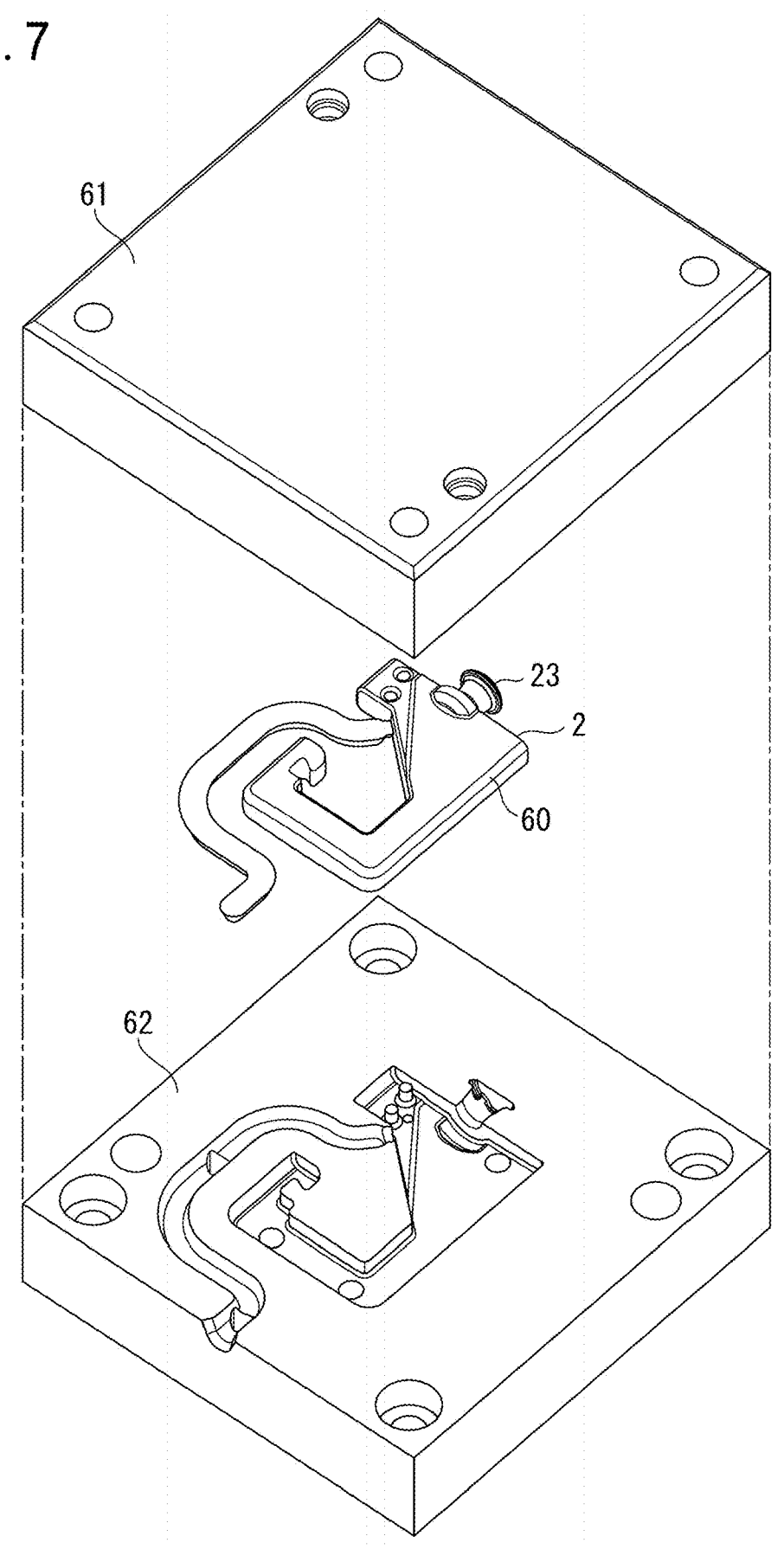
FIG. 7 is a diagram of assistance in explaining a mold used for injection molding of a hook member of the halter snap.

First, a primary molded product 60 (in the exemplary embodiment, the hook member 2 (except the opening/closing member 24)) is integrally injection-molded using halved molds 61, 62 illustrated in FIG. 7. Specifically, POM with a temperature in a range from 220 to 180 degrees C. is injected into a space formed between the molds 61, 62 and demolded at a surface temperature of the primary molded product 60 in a range from 90 to 100 degrees C.

Figure 8:
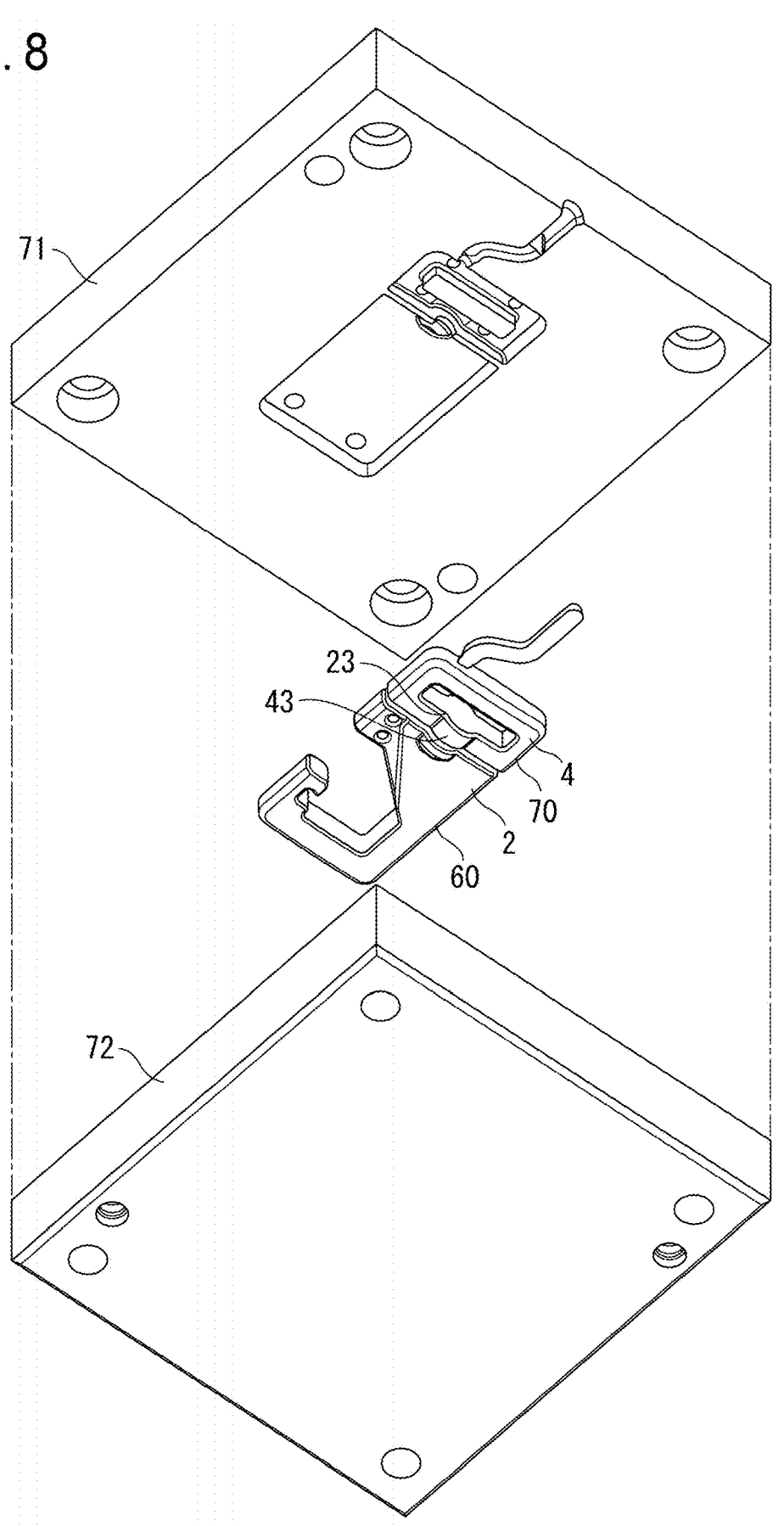
FIG. 8 is a diagram of assistance in explaining a mold used for injection molding of a holder member of the halter snap.
Figure 9:
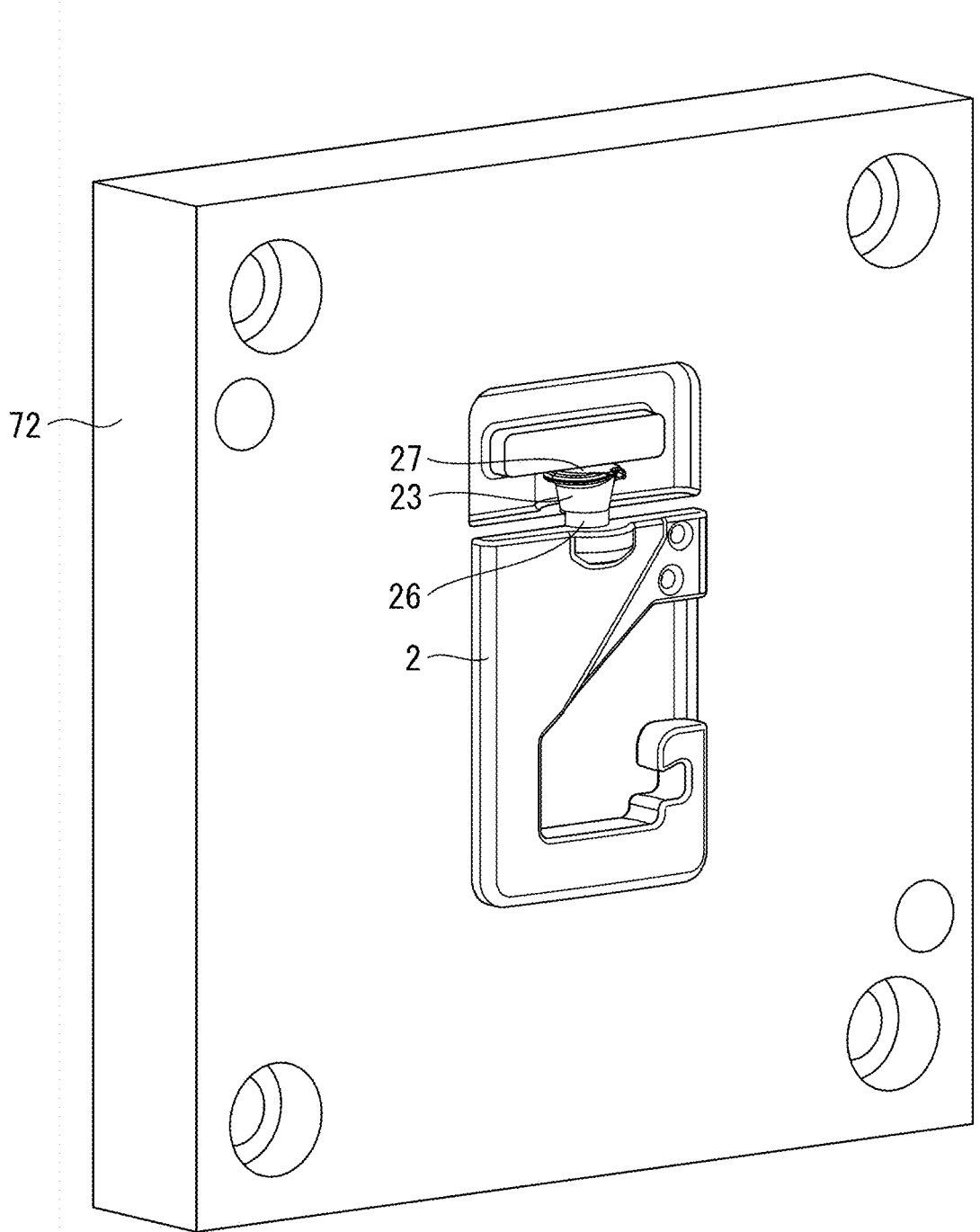
FIG. 9 is a diagram of assistance in explaining the mold used for injection molding of the holder member.
Figure 10:
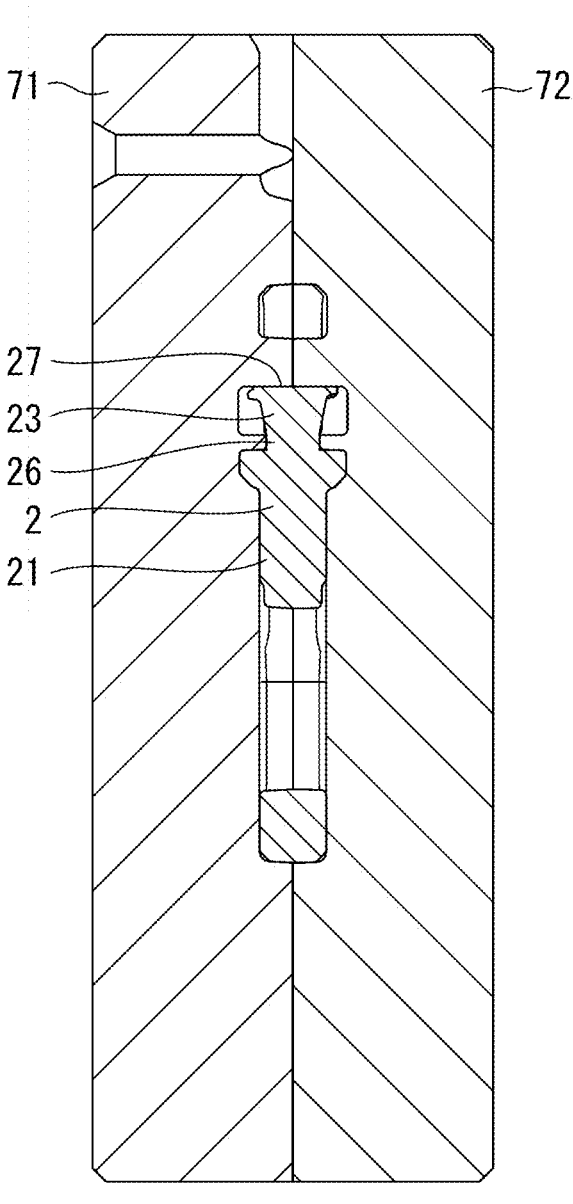
FIG. 10 is a cross-sectional view of the mold used for injection molding of the holder member.

Next, a secondary molded product 70 (in the exemplary embodiment, the holder member 4) is integrally injection-molded using halved molds 71, 72 illustrated in FIG. 8 to FIG. 10. For the injection molding of the secondary molded product 70, it is sufficient that a surface of the primary molded product 60 is hardened. Specifically, the primary molded product 60 is placed in a space formed between the molds 71, 72, POM is injected at a temperature in a range from 160 to 170 degrees C., and hardening of the secondary molded product 70 is awaited. It takes thirty seconds, approximately, in the exemplary embodiment from the injection of POM into the space formed between the molds 61, 62 (the injection molding of the primary molded product 60) and the injection of POM into the space formed between the molds 71, 72 (the injection molding of the secondary molded product 70).

At this time, although the facing surfaces 211, 411 are spaced from each other in the X-axis direction as described above, the shaft 23 (except the base portion 26) and the bearing portion 43 are in a state of being contact-coupled to each other as illustrated in FIG. 5 with the first guide circumferential portion 30 in the form of a male thread being screwed in the second guide circumferential portion 50 in the form of a female thread.

Next, the hook member 2 and the holder member 4 are relatively rotated in the respective R directions, causing the shaft 23 to move upward with respect to the bearing portion 43 by the amount corresponding to the dimension L3 in the axial direction one time only while the first guide circumferential portion 30 is slide-guided by the second guide circumferential portion 50. The state illustrated in FIG. 4 is thus reached. By virtue of this one-time movement, the first guide circumferential portion 30 is separated from the second guide circumferential portion 50, and the distal portion 27 of the shaft 23 is located to project upward from the bearing portion 43 and engaged with the bearing portion 43 in the axial direction to maintain a rotatably coupled state of the hook member 2 and the holder member 4. The base portion 26 of the shaft 23 is put into the state illustrated in FIG. 4 (a state of being covered with the bearing portion 43) from the state illustrated in FIG. 5 with the distal portion 27 projecting upward from the bearing portion 43 by an amount corresponding to the covering of the base portion 26 with the bearing portion 43 (the amount corresponding to the dimension L3 in the axial direction). It should be noted that a portion of the shaft 23 other than the base portion 26 and the distal portion 27 remain in a state of being covered with the bearing portion 43 irrespective of before or after the relative rotation of the hook member 2 and the holder member 4.

6

The base portion 26 of the shaft 23 is slidably in contact with the first end portion 46 of the bearing portion 43. The portion of the shaft 23 between the base portion 26 and the distal portion 27 is spaced from the bearing portion 43 with a gap in a direction along a plane perpendicular to the X-axis direction. Additionally, a gap in the axial direction between the hook member 2 and the holder member 4 is smaller than 0.5 mm and, in the exemplary embodiment, the facing surfaces 211, 411 are slidably in contact with each other. Additionally, a gap in the radial direction between a portion of the bearing portion 43 other than the shape-conformable portion to the distal portion 27 of the shaft 23 and the shaft 23 is smaller than 0.5 mm.

The hook member 2 and the holder member 4 described above thus configure the rotary coupling structure allowing for mutual rotation in the respective R directions.

Modifications

In the above exemplary embodiment, the dimension L1 of the shaft 23 in the axial direction is longer than the dimension L2 of the bearing portion 43 in the axial direction and the shaft 23 is movable in the axial direction with respect to the bearing portion 43 but this is not limiting. The dimensions L1, L2 in the axial direction may be substantially equivalent lengths, provided that the shaft 23 is rotatable in the R direction with respect to the bearing portion 43.

In the above exemplary embodiment, the shaft 23 is formed in the shape of a truncated cone to cause the dimension in the width direction intersecting the axial direction to be gradually increased from the base portion 26, which is continuous with a primary molded product body (the hook body 21), toward the distal portion 27; however, the shaft 23 may be formed in another shape without a gradual increase in a case where it is not necessary to form a gap in the R direction between the shaft 23 and the bearing portion 43.

In the above exemplary embodiment, the first guide circumferential portion 30 is formed in the distal portion 27 of the shaft 23 and the second guide circumferential portion 50 is formed in the bearing portion 43: however, the first guide circumferential portion 30 and the second guide circumferential portion 50 are not necessarily formed.

In the above exemplary embodiment, the hook body 21 and shaft 23 and the holder member 4 are independently integrally injection-molded from POM but this is not limiting. The hook body 21 and the shaft 23 may be integrally injection-molded from POM or PA (polyamide) and the holder member 4 may be integrally injection-molded from POM, PA, or ABS (a copolymer synthetic resin of acrylonitrile, butadiene, and styrene). Alternatively, the hook body 21 and the shaft 23 may be integrally injection-molded from POM, PA, or ABS and the holder member 4 may be integrally injection-molded from POM or PA. For instance, the hook body 21 and the shaft 23 may be integrally injection-molded from POM and the holder member 4 may be integrally injection-molded from PA, or the hook body 21 and the shaft 23 may be integrally injection-molded from PA and the holder member 4 may be integrally injection-molded from POM. In addition to the above, the material of the hook body 21 and the shaft 23 and the material of the holder member 4 may be combined as desired.

In the above exemplary embodiment, the rotary coupler including, as the first member, the hook member 2 including the shaft 23 and, as the second member, the holder member 4 including the bearing portion 43 is provided. In place of the above, a rotary coupler including, as the first member, the holder member 4 including the shaft 23 and, as the second member, the hook member 2 including the bearing portion 43 may be provided.

In the above exemplary embodiment, at least in a state where the shaft 23 is rotatable with respect to the bearing portion 43, the gap in the axial direction between the hook member 2 and the holder member 4 is smaller than 0.5 mm but this is not limiting. The design may be made to cause the gap in the axial direction to be equal to or larger than 0.5 mm. Additionally, the gap in the radial direction between the portion of the bearing portion 43 other than the shape-conformable portion to the distal portion 27 of the shaft 23 and the shaft 23 is smaller than 0.5 mm but this is not limiting. The design may be made to cause the gap in the radial direction to be equal to or larger than 0.5 mm.

In the above exemplary embodiment, the distal portion 27 of the shaft 23 is solid, has a circumferential exterior surface 271 continuous in the R direction, and is formed irreducible in diameter, whereas the bearing portion 43 has the circumferential interior surface 431 continuous in the R direction and is formed unincreasable in diameter, but this is not limiting. As long as the coupled state of the hook member 2 and the holder member 4 is able to be maintained, the forms may be altered, if necessary: the shaft 23 may be formed reducible in diameter and the bearing portion 43 may be formed increasable in diameter.

In the above exemplary embodiment, the halter snap 1 is described as a rotary coupler; however, the halter snap 1 is not limiting, provided that the above-described rotary coupling structure is provided. For instance, the above-described rotary coupling structure may be provided as a coupling structure of a puller and a body of a slider of a sliding zipper.

SUMMARY OF THE INVENTION

A rotary coupling structure according to the above aspect of the invention includes a primary molded product and a secondary molded product, the primary molded product and the secondary molded product being injection-molded from resin, the primary molded product and the secondary molded product being rotatably coupled to each other, in which the primary molded product includes a shaft, the secondary molded product includes a bearing portion coupled to the shaft, and the shaft is configured to rotate after being moved from a state where the shaft is contact-coupled to the bearing portion.

With the rotary coupling structure according to the above aspect of the invention, the shaft is in the contact-coupled state before moved with respect to the bearing portion, which eliminates the necessity for time and effort for hand assembling of the primary molded product and the secondary molded product after the resin injection molding. Additionally, the shaft in the state of being contact-coupled to the bearing portion becomes rotatable after being moved with respect to the bearing portion, which eliminates the necessity for making a gap (an initial gap) in advance between the shaft and the bearing portion to allow for reducing a clearance between the shaft and the bearing portion in accordance with the elimination of the necessity for setting the initial gap.

In the rotary coupling structure according to the above aspect of the invention, a dimension of the shaft in the axial direction may be longer than a dimension of the bearing portion in the axial direction, and the shaft may be movable in the axial direction with respect to the bearing portion.

Such a configuration makes it possible to put the shaft into the rotatable state by moving the shaft in the axial direction with respect to the bearing portion.

In the rotary coupling structure according to the above aspect of the invention, the primary molded product may include the primary molded product body from which the shaft is formed to project, and a dimension of the shaft in the width direction intersecting the axial direction may be gradually increased from the base portion continuous with the primary molded product body toward the distal portion.

By virtue of such a configuration, it is possible to form a gap between the shaft and the bearing portion by moving the shaft in the axial direction with respect to the bearing portion. Such formation of the gap allows the shaft to be more smoothly rotated with respect to the bearing portion.

In the rotary coupling structure according to the above aspect of the invention, the shaft may be formed in a shape of a truncated cone with a diameter increased from the base portion toward the distal portion.

In the rotary coupling structure according to the above aspect of the invention, the distal portion of the shaft may include a first guide circumferential portion having a first end and a second end, the first guide circumferential portion extending in a circumferential direction around an axial center of the shaft in an inclined manner such that the first end and the second end are at different positions in the axial direction, and the bearing portion may include a second guide circumferential portion in a complementary shape fittable to the first guide circumferential portion.

By virtue of such a configuration, while the shaft and the bearing portion are in the contact-coupled state during the injection molding of the secondary molded product from resin, the movement of the shaft in the axial direction relative to the bearing portion is allowed to be guided by the first guide circumferential portion and the second guide circumferential portion with the relative rotation of the shaft and the bearing portion, which makes it possible to easily put the shaft into the state of being rotatable with respect to the bearing portion.

Additionally, the presence of the first guide circumferential portion in the distal portion of the shaft makes it possible to reduce a rattling motion of the shaft in the axial direction with respect to the bearing portion even though the shaft is put in the state of being rotatable with respect to the bearing portion.

In the rotary coupling structure according to the above aspect of the invention, one of the primary molded product and the secondary molded product may include POM or PA, and the other of the primary molded product and the secondary molded product may include POM, PA, or ABS.

A rotary coupler according to the another aspect of the invention includes a hook member and a holder member, the hook member and the holder member being injection-molded from resin, in which the hook member includes a shaft formed irreducible in diameter, the holder member includes a bearing portion formed unincreasable in diameter, the shaft is configured to rotate after being moved from a state where the shaft is contact-coupled to the bearing portion, and in a state where the shaft is rotatable with respect to the bearing portion, a gap in an axial direction of the rotary coupler between the hook member and the holder member is smaller than 0.5 mm.

The rotary coupler according to the another aspect of the invention is able to exhibit workings and effects similar to the workings and effects of the above-described rotary coupling structure. Further, for instance, it is possible to improve the strength of coupling between the first member and the second member as compared with in a case where, for instance, a groove or the like is formed in a bearing or a bearing portion such that a diameter is reducible or increasable.

In the rotary coupler according to the another aspect of the invention, a dimension of a distal portion of the shaft in a radial direction may be larger than a dimension of a base portion of the shaft in the radial direction, the shaft may include a shape-conformable portion to the bearing portion, and in the state where the shaft is rotatable with respect to the bearing portion, a gap in the radial direction between a portion of the bearing portion other than the shape-conformable portion to the distal portion and the shaft may be smaller than 0.5 mm.

In the rotary coupler according to the another aspect of the invention, the distal portion of the shaft of the hook member may is solid and has a circumferential exterior surface continuous in a circumferential direction, and the bearing portion of the holder member may have a circumferential interior surface continuous in the circumferential direction.

In the rotary coupler according to the another aspect of the invention, a dimension of the shaft in the axial direction may be longer than a dimension of the bearing portion in the axial direction, and the shaft may be movable in the axial direction with respect to the bearing portion.

Such a configuration makes it possible to put the shaft into the rotatable state by moving the shaft in the axial direction with respect to the bearing portion.

In the rotary coupler according to the another aspect of the invention, the hook member may include a hook body from which the shaft is formed to project, and a dimension of the shaft in a width direction intersecting the axial direction may be gradually increased from a base portion continuous with the hook body toward a distal portion.

By virtue of such a configuration, it is possible to form a gap between the shaft and the bearing portion by moving the shaft in the axial direction with respect to the bearing portion. Such formation of the gap allows the shaft to be more smoothly rotated with respect to the bearing portion.

In the rotary coupler according to the another aspect of the invention, the shaft may be formed in a shape of a truncated cone with a diameter increased from the base portion toward the distal portion.

In the rotary coupler according to the another aspect of the invention, the distal portion of the shaft may include a first guide circumferential portion having a first end and a second end, the first guide circumferential portion extending in a circumferential direction around an axial center of the shaft in an inclined manner such that the first end and the second end are at different positions in the axial direction, and the bearing portion may include a second guide circumferential portion in a complementary shape fittable to the first guide circumferential portion.

By virtue of such a configuration, while the shaft and the bearing portion are in the contact-coupled state during the injection molding of the holder body from resin, the movement of the shaft in the axial direction with respect to the bearing portion is allowed to be guided by the first guide circumferential portion and the second guide circumferential portion with the relative rotation of the shaft and the bearing portion, which makes it possible to easily put the shaft into the state of being rotatable with respect to the bearing portion.

Additionally, the presence of the first guide circumferential portion in the distal portion of the shaft makes it possible to reduce a rattling motion of the shaft in the axial direction with respect to the bearing portion even though the shaft is put in the state of being rotatable with respect to the bearing portion.

In the rotary coupler according to the another aspect of the invention, one of the hook member and the holder member may include POM or PA, and the other of the hook member and the holder member may include POM, PA, or ABS.

In the rotary coupler according to the another aspect of the invention, the hook member including the shaft may be injection-molded from resin, after a surface of the hook member is hardened, the holder member may be injection-molded from resin so that the bearing portion is formed in a state of being contact-coupled to the shaft, and after the hook member and the holder member are hardened, the shaft may be moved with respect to the bearing portion one time only and put into a rotatable state.

A method of configuring a rotary coupling structure according to the still another aspect of the invention includes: injection-molding a primary molded product including a shaft from resin; after hardening of a surface of the primary molded product, injection-molding a secondary molded product from resin in such manner that a bearing portion is formed in a state of being contact-coupled to the shaft; and after hardening of the primary molded product and the secondary molded product, moving the shaft with respect to the bearing portion one time only to put the shaft into a rotatable state.

The method of configuring the rotary coupling structure according to the still another aspect of the invention makes it possible to configure the above-described rotary coupling structure.

The invention claimed is:

1. A rotary coupling structure comprising a primary molded product and a secondary molded product, the primary molded product and the secondary molded product being injection-molded from resin, the primary molded product and the secondary molded product being rotatably coupled to each other, wherein
   the primary molded product comprises a shaft,
   the secondary molded product comprises a bearing portion coupled to the shaft,
   the shaft is configured to rotate after being moved from a state where the shaft is contact-coupled to the bearing portion,
   a distal portion of the shaft comprises a first guide circumferential portion having a first end and a second end, the first guide circumferential portion extending in a circumferential direction around an axial center of the shaft in an inclined manner such that the first end and the second end are at different positions in the axial direction, and
   the bearing portion comprises a second guide circumferential portion in a complementary shape fittable to the first guide circumferential portion.

2. The rotary coupling structure according to claim 1, wherein
   a dimension of the shaft in an axial direction of the rotary coupling structure is longer than a dimension of the bearing portion in the axial direction, and
   the shaft is movable in the axial direction with respect to the bearing portion.

3. The rotary coupling structure according to claim 1, wherein
   the primary molded product comprises a primary molded product body from which the shaft is formed to project, and the shaft comprises a base portion continuous with the primary molded product body and the distal portion and a dimension of the shaft in a width direction intersecting the axial direction is gradually increased from the base portion toward the distal portion.

4. The rotary coupling structure according to claim 3, wherein the shaft is formed in a shape of a truncated cone with a diameter increased from the base portion toward the distal portion.

5. The rotary coupling structure according to claim 1, wherein one of the primary molded product and the secondary molded product comprises POM or PA, and an other of the primary molded product and the secondary molded product comprises POM, PA, or ABS.

6. A rotary coupler comprising a hook member and a holder member, the hook member and the holder member being injection-molded from resin, wherein the hook member comprises a shaft formed irreducible in diameter, the holder member comprises a bearing portion formed unincreasable in diameter, the shaft is configured to rotate after being moved from a state where the shaft is contact-coupled to the bearing portion, in a state where the shaft is rotatable with respect to the bearing portion, a gap in an axial direction of the rotary coupler between the hook member and the holder member is smaller than 0.5 mm, a distal portion of the shaft comprises a first guide circumferential portion having a first end and a second end, the first guide circumferential portion extending in a circumferential direction around an axial center of the shaft in an inclined manner such that the first end and the second end are at different positions in the axial direction, and the bearing portion comprises a second guide circumferential portion in a complementary shape fittable to the first guide circumferential portion.

7. The rotary coupler according to claim 6, wherein a dimension of the distal portion of the shaft in a radial direction is larger than a dimension of a base portion of the shaft in the radial direction, the shaft comprises a shape-conformable portion to the bearing portion, and in the state where the shaft is rotatable with respect to the bearing portion, a gap in the radial direction between a portion of the bearing portion other than the shape-conformable portion to the distal portion and the shaft is smaller than 0.5 mm.

8. The rotary coupler according to claim 6, wherein a distal portion of the shaft of the hook member is solid and has a circumferential exterior surface continuous in a circumferential direction, and the bearing portion of the holder member has a circumferential interior surface continuous in the circumferential direction.

9. The rotary coupler according to claim 6, wherein a dimension of the shaft in the axial direction of the rotary coupler is longer than a dimension of the bearing portion in the axial direction, and the shaft is movable in the axial direction with respect to the bearing portion.

10. The rotary coupler according to claim 6, wherein the hook member comprises a hook body from which the shaft projects, and the shaft comprises a base portion continuous with the hook body and a distal portion, and a dimension of the shaft in a width direction intersecting the axial direction is gradually increased from the base portion toward the distal portion.

11. The rotary coupler according to claim 10, wherein the shaft is formed in a shape of a truncated cone with a diameter increased from the base portion toward the distal portion.

12. The rotary coupler according to claim 6, wherein one of the hook member and the holder member comprises POM or PA, and an other of the hook member and the holder member comprises POM, PA, or ABS.

13. The rotary coupler according to claim 6, wherein the hook member comprising the shaft is injection-molded from resin, after hardening of the hook member, the holder member is injection-molded from resin in such a manner that the bearing portion is formed in a state of being contact-coupled to the shaft, and after hardening of the hook member and the holder member, the shaft is moved with respect to the bearing portion one time only to be put into a rotatable state.

* * * * *